United States Patent
John et al.

(10) Patent No.: US 8,214,629 B2
(45) Date of Patent: *Jul. 3, 2012

(54) COMPUTER SYSTEM WITH SECURE INSTANTLY AVAILABLE APPLICATIONS USING NON-VOLATILE WRITE-PROTECTED MEMORY

(75) Inventors: Eugene B John, Austin, TX (US); Thomas John, Austin, TX (US); Lizy K John, Austin, TX (US)

(73) Assignee: Texas Digital and Multimedia Systems, Austin, TX (US)

( * ) Notice: Subject to any disclaimer, the term of this patent is extended or adjusted under 35 U.S.C. 154(b) by 566 days.

This patent is subject to a terminal disclaimer.

(21) Appl. No.: 12/234,756

(22) Filed: Sep. 22, 2008

(65) Prior Publication Data

US 2010/0058046 A1    Mar. 4, 2010

Related U.S. Application Data

(63) Continuation-in-part of application No. 12/198,133, filed on Aug. 26, 2008.

(51) Int. Cl.
*G06F 9/00* (2006.01)
*G06F 9/24* (2006.01)
*G06F 15/177* (2006.01)

(52) U.S. Cl. .......................................... 713/1

(58) Field of Classification Search .................. 713/1
See application file for complete search history.

(56) References Cited

U.S. PATENT DOCUMENTS

| | | | | |
|---|---|---|---|---|
| 7,069,445 B2* | 6/2006 | Cheston et al. | ............... | 713/187 |
| 7,516,315 B2* | 4/2009 | Wood et al. | ....................... | 713/1 |
| 2008/0270811 A1* | 10/2008 | Chow et al. | ................... | 713/323 |
| 2009/0037722 A1* | 2/2009 | Chong et al. | ...................... | 713/2 |
| 2009/0158000 A1* | 6/2009 | Takahashi | ..................... | 711/202 |

\* cited by examiner

*Primary Examiner* — Mohammed Rehman

(57) ABSTRACT

A method and apparatus for instantly-available applications in a computer system is presented. A computer that incorporates fast non-volatile primary memory for storing the application software and/or operating system, resulting in an instant-on computer is presented. Large parts of the application code and/or operating system code are stored in non-volatile write-protectable areas of the memory that cannot be modified by malicious sources, resulting in a secure computer. It solves the problem of typical computers having to load the applications from a slow device such as the hard disk to the main memory. This loading is avoided by permanently housing the applications in a non-volatile main memory. The system also solves the problem of corruption of application software areas from malicious sources. The memory system contains writeable and write-protected areas and a memory controller that controls the access to the various regions of the memory.

14 Claims, 8 Drawing Sheets

COMPUTER SYSTEM WITH SECURE INSTANTLY AVAILABLE APPLICATIONS USING NON-VOLATILE WRITE-PROTECTED MEMORY

FIELD OF INVENTION

The present invention relates to the field of computer systems. Specifically the present invention relates to a computer incorporating fast non-volatile primary memory for storing computer applications, resulting in the applications being available for use as soon as the computer is turned on. It also relates to a computer that stores large parts of application and/or the operating system code in non-volatile write-protectable areas that cannot be modified by malicious sources, resulting in a secure computer.

BACKGROUND OF THE INVENTION

At power on, computer systems typically take several minutes to boot the system. This happens because the operating system and applications have to be loaded from a slow storage device such as the hard disk to the system RAM. If a system crashes during use, a user has to wait several minutes to get the system back to use, because the entire boot/load process has to happen. This is annoying and inconvenient to computer users. The present invention consists of a solution to this problem providing an instantly-on computer.

Another problem in computers is corruption of the operating system or application code due to malicious sources. Often applications such as Microsoft Office have to be reinstalled after a malicious attack on the computer. The present invention consists of a method for a secure computer, where applications and/or operating system are stored in a write-protectable medium avoiding corruption by malicious sources.

SUMMARY OF THE INVENTION

Typically in computer systems only a very small part of the boot software is in a fast semiconductor memory. The applications as well as the main operating system code are in the hard drive. The present invention consists of storing the application code in write-protected fast non-volatile memory. By fast, a storage device faster than hard disk is referenced. An example of such a fast non-volatile memory is flash memory. A part of the memory allows read/write accesses. The parts of operating system/application code that need write accesses are stored in this region of the memory. A part of this region is also assigned for the operating system to use for virtual memory, if needed.

Another part of the invention consists of storing large parts of the applications and operating system in write-protected fast non-volatile write-protectable memory. Some writeable area is required for most applications and operating system programs. This is provided in a special region of the write-protectable memory.

Thus the application software and/or operating system, instead of being in the hard disk, will be resident in the fast non-volatile memory, requiring no loading i.e. the applications are already permanently loaded, resulting in a rapidly-on or instant-boot computer in which applications are available as soon as the computer is turned on. If the fast non-volatile memory does not have enough space to hold all applications, key applications can permanently reside in the fast non-volatile memory and the remaining applications can use the current virtual memory system. The applications alone or both applications and operating system can reside in the non-volatile memory.

BRIEF DESCRIPTION OF THE DRAWINGS

A better understanding of the present invention can be obtained when the following detailed description is considered in conjunction with the following drawings.

DETAILED DESCRIPTION OF THE INVENTION

In the following description, several specific details are set forth to provide a thorough understanding of the present invention. However, it will be apparent to those skilled in the art that the present invention can be practiced with variations of the details. Similarly, many details which are within the skills of persons of ordinary skill in the art have been omitted.

Virtual memory [13, 14] has been used in computers for more than 3 decades to create the illusion of large contiguous memory regions for each application. In systems with virtual memories, RAM is used as real memory and applications run from the real memory, also called main memory. Main memory is typically volatile. At power on, the operating system has to be loaded from the disk to the main memory. Since modern operating systems contain a large amount of code, this loading takes several minutes and the delay is annoying and inconvenient to users. But virtual memory system makes it possible for users to not worry about memory size, since applications can be paged in or out.

Figure 1:
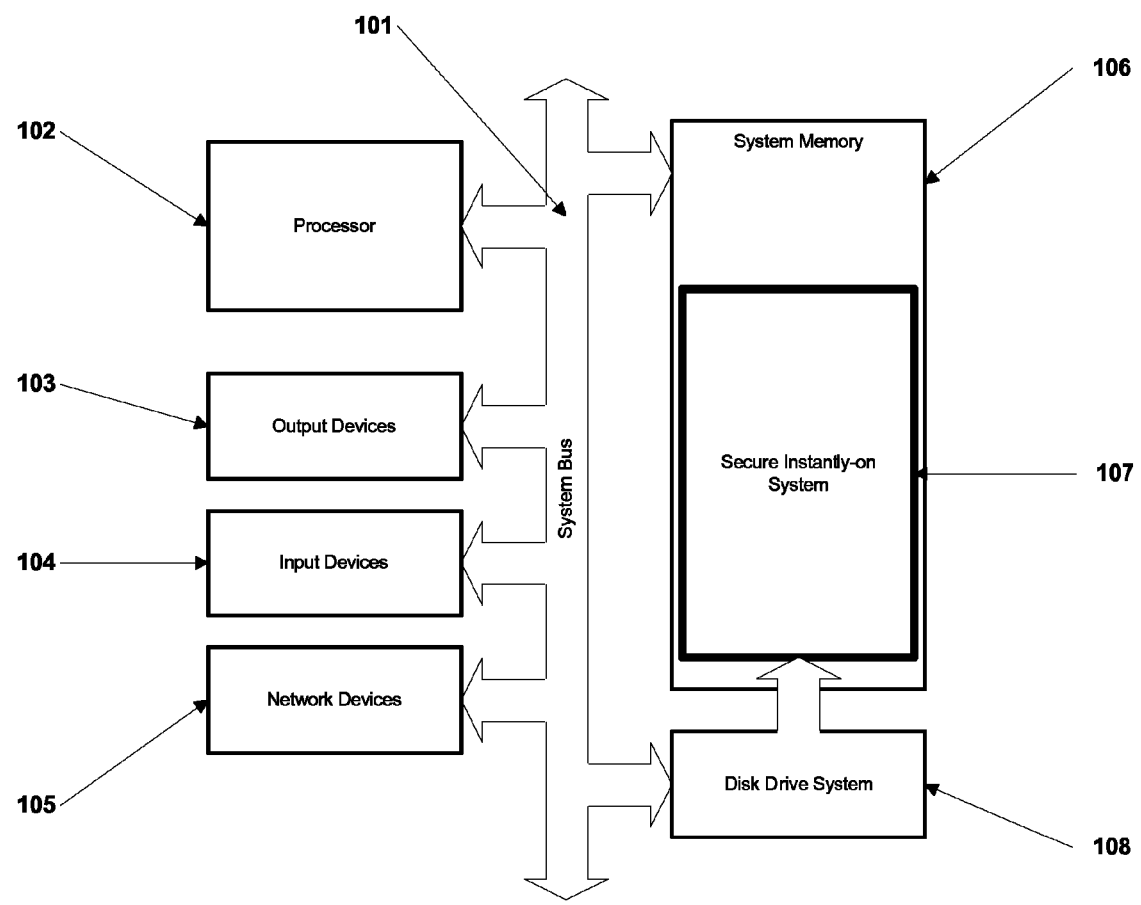
FIG. 1 illustrates a computer system in accordance with the present invention.

FIG. 1 illustrates a computer system with non-volatile RAM as the main memory. The CPU can consist of single core or multi-core processors. The CPU can include zero or multiple levels of caches.

The computer in FIG. 1 may contain, but are not limited to the following components: A system bus 101 enables communication between the different parts of the computer system. The CPU 102 may consist of one or more physical processors that execute computer program instructions serially or in parallel. The computer system will have zero or more output devices 103 such as video monitors, video displays (such as television displays), audio output devices (such as speakers.) The computer system will have zero or more input devices 104 which may include devices such as keyboards, mice, tablets, audio microphones or other sensors. The computer may have zero or more network devices 105 for communication. Examples of network devices include computer network interfaces, audio/video networks, telephone networks and wireless communication networks. The computer may have other devices, not explicitly mentioned here, attached to the system bus.

The system bus 101 enables communication between different components of the computer system, in particular with its system memory 106 and its disk drive system 108. The secure instant-on system 107 may communicate directly to the CPU(s), and/or via the system memory 106 and/or via the disk drive system 108. The system memory 106 contains the instant-on system 107. The instant-on system 107 may communicate directly to the CPU via the disk drive system 108. The instant-on system refers to a system in which the applications are available instantly after the computer is booted.

There can be several variations of this system. For instance, one variation may have the instant-on system 107 as an independent component connected to the system bus 101, without being part of the main memory. Such a system can contain a separate memory module. In such a system, the component 107 can communicate to the CPU directly and also to the memory as well as disk separately.

Figure 2:
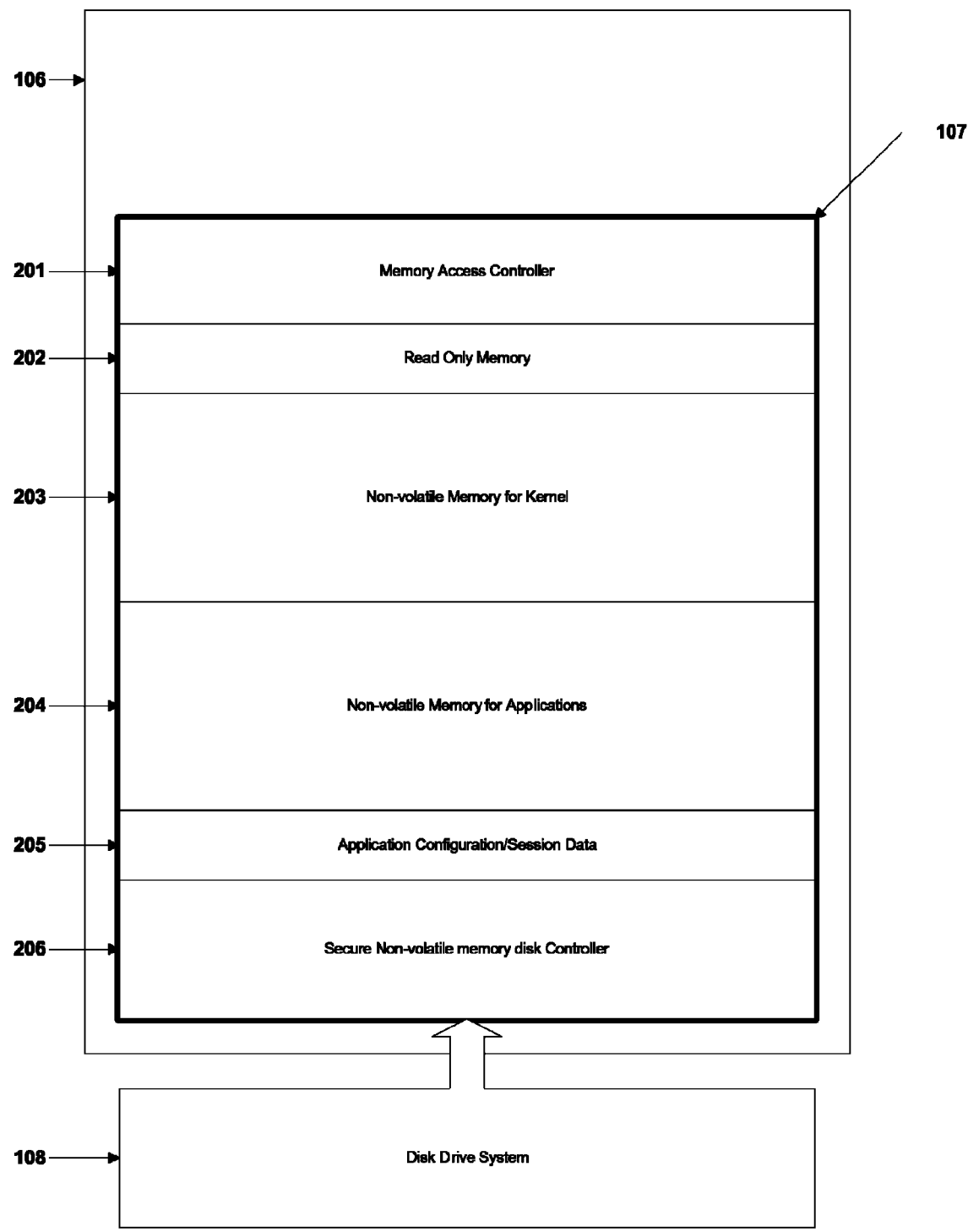
FIG. 2 illustrates parts of secure instant-on system, showing two ways in which contents of its non-volatile memory may be accessed.

FIG. 2 illustrates the main parts of the secure instantly-on system 107. As in FIG. 1, the CPU 102, the system memory 106 or the disk drive system 108, or all, may communicate with parts of the instantly on system 107.

The instantly-on system 107 may contain memory access controller 201 to regulate access to memory locations within 107. The memory locations within 107 may contain a read-only memory 202. The read-only memory 202 may store the computer BIOS and may be compatible with one or more operating systems. The non-volatile memory for kernel 203 stores the programs of the operating system. The non-volatile memory for applications 204 stores application programs, such as word processors. The application configuration/session data area 205 stores information needed by application programs and/or operating systems may be stored in volatile or non-volatile memory. The secure memory disk controller 206 interfaces with the disk drive system 108. The component 206 provides access to contents of memory areas 202-205 as if they were in a disk drive, but with added protections to regulate modification of these contents.

Figure 3:
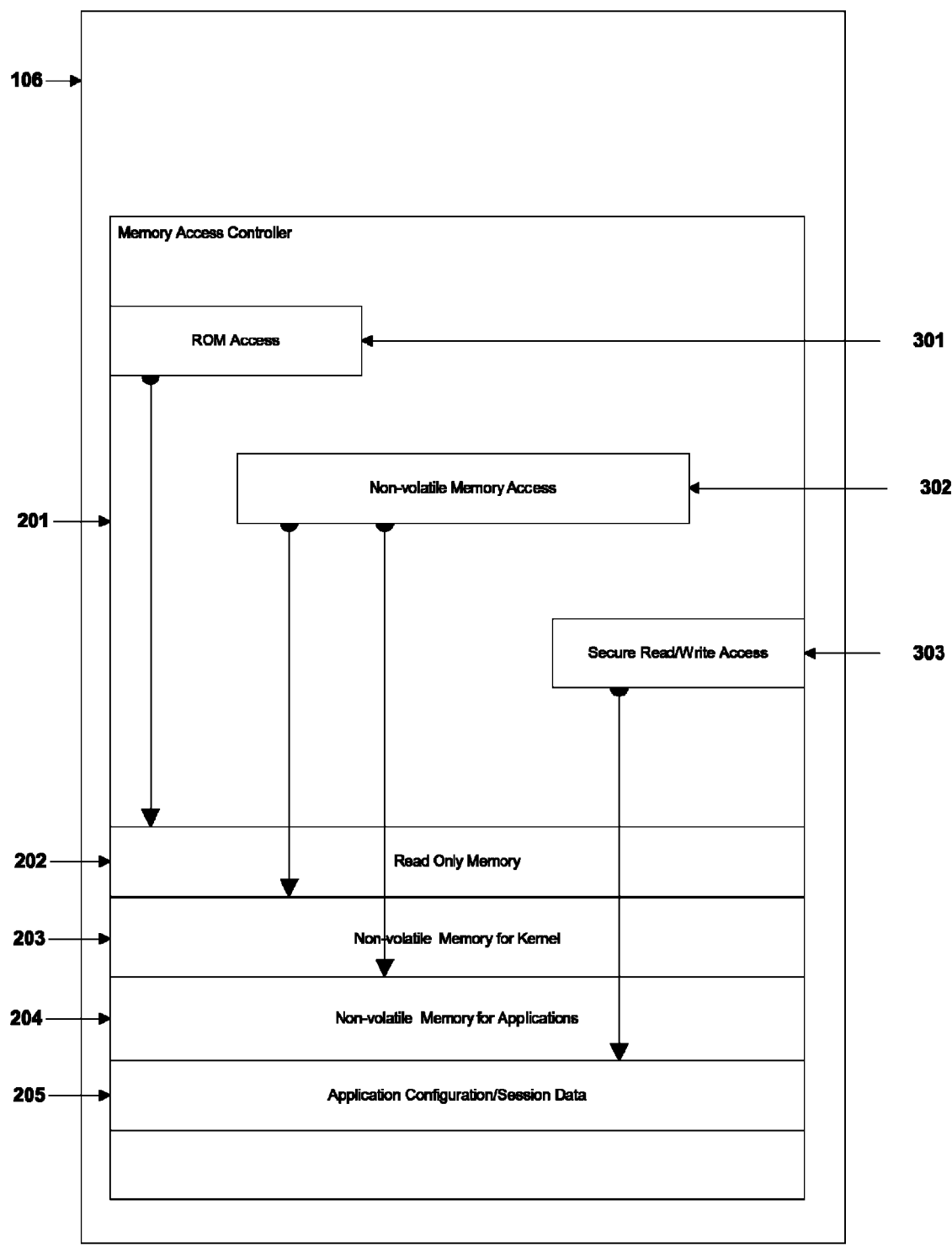
FIG. 3 illustrates secure access of programs and data through the computer's system memory.

FIG. 3 illustrates components of the memory access controller 201. One component may be ROM access component 301 which reads, but does not write, information contained in the ROM 202. The non-volatile memory access component 302 reads, but does not write, information contained in both the non-volatile memory for kernel 203 and the non-volatile memory for applications 204. The secure read/write access component 303 reads and writes information contained in the application configuration/session data area.

Figure 4:
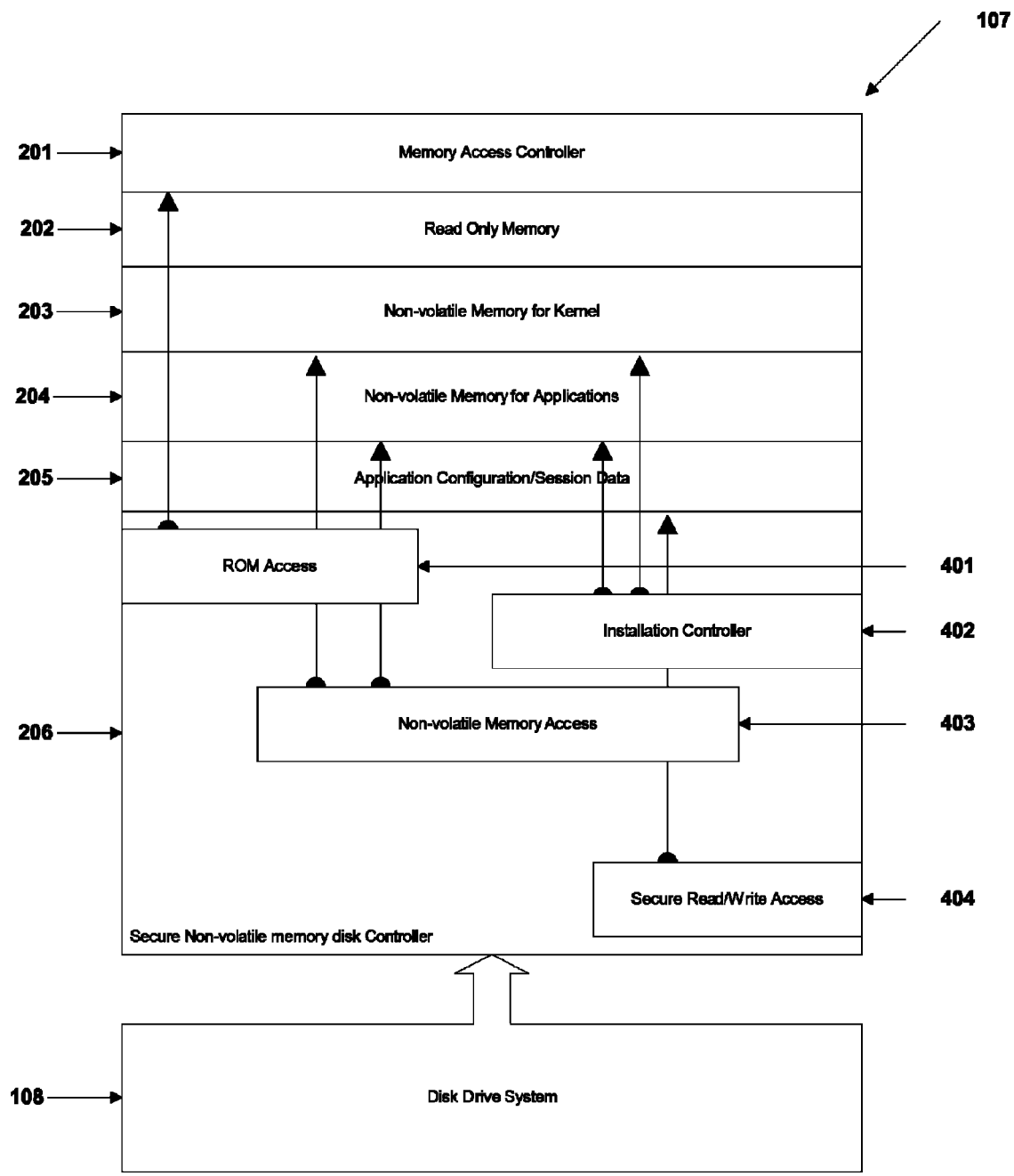
FIG. 4 illustrates secure access of programs and data through the computer's disk drive control system.

FIG. 4 illustrates components of the secure non-volatile memory controller 206. We also refer to it as a RAM disk controller, indicating a non-volatile disk-like component situated inside the permanent memory, previously the RAM. The RAM disk controller may contain a component 401 which reads, but does not write, information contained in the ROM 202. The RAM disk controller may contain an installation controller 402 that may write information into the non-volatile memory for kernel 203, or the non-volatile memory for applications 204, or both. In addition, the RAM disk controller may contain a read only non-volatile memory access controller 404. The RAM disk controller may also contain a secure read/write access component 405 to read and write information in the application configuration/session data area. In operating systems such as Windows, the registry holds some of the configuration data. In addition to the configuration and registry information, there are several pieces of changeable data that needs to be written, specific to the application and session that is going on. This data is also referred to as changeable data in many parts of the description of this invention.

Figure 5:
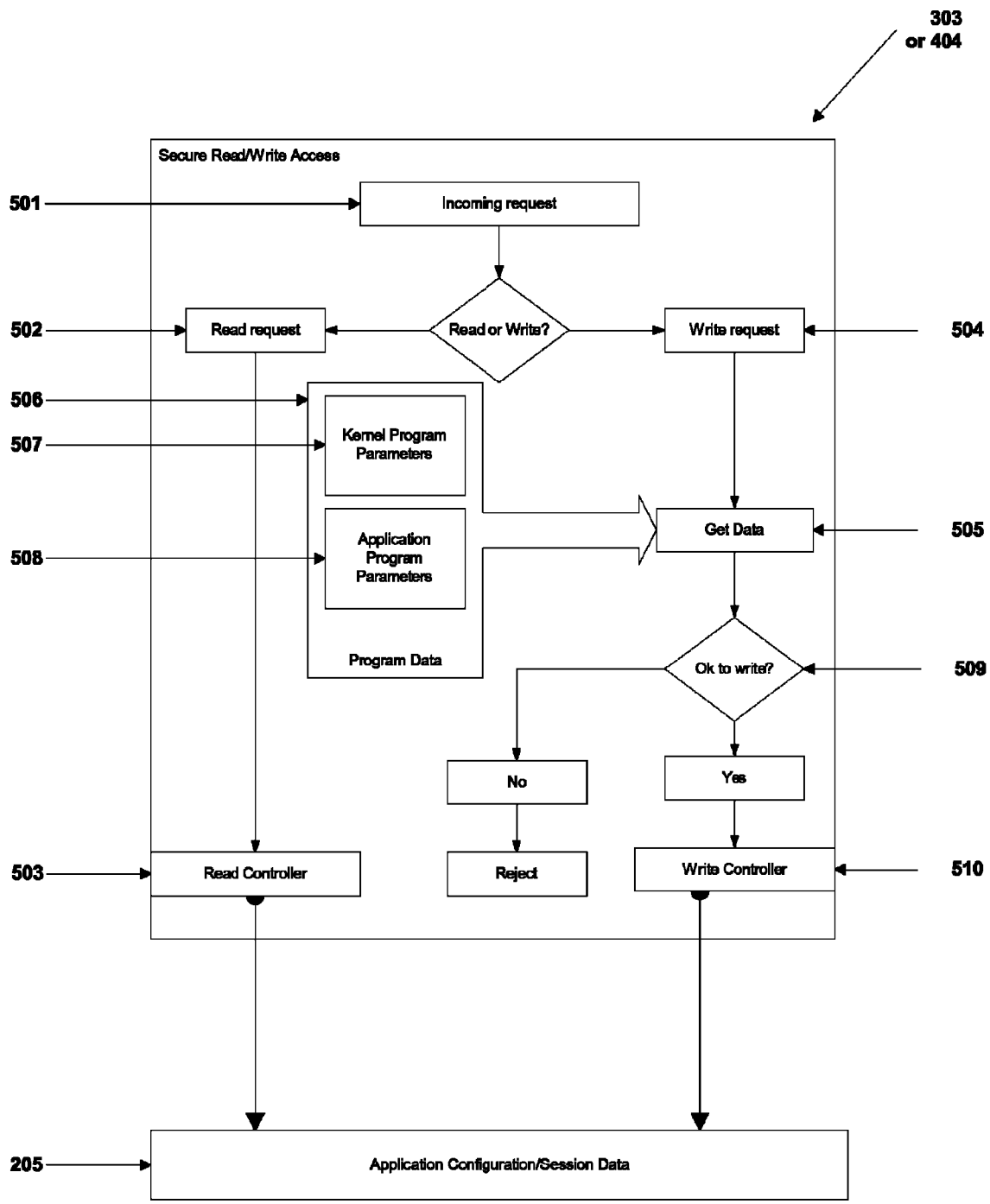
FIG. 5 illustrates details of the secure access component to read and write application configuration or session data.

FIG. 5 illustrates details of the secure read/write access component. This component is accessed whenever the computer system wants to write information relevant to a specific operating system or application program. This is controlled using the read/write access component 303 if the request comes through system memory 106. If the request for read/write is coming through the disk drive system 108, then this is controlled using the read/write access component 404. FIG. 5 illustrates the details for both 303 and 404.

The secure read/write access component 303 or 404 gets incoming requests 501 for access to changeable data in the application configuration/session data area 205. A request 501 may be a request to read data or it may be to write data. If the request is a read request 502, then the request is forwarded to a read controller 503 which fetches the relevant data from the data area 205.

If the request 501 is a write request 504, then the request is sent to a component 505 that has to fetch some application-specific information before deciding whether to allow the write operation associated with the request. Information about specific programs is stored in a non-volatile memory area 506. The information in 506 contains two areas: information specific to kernel programs is stored in an area 507 while information about applications is stored in another area 508. In the present invention, programs are enhanced with information about their expected behavior. If viruses or other malicious software were to modify a program or data associated with the program, then a component decides whether this operation is within the normal range of activities for the associated program. The originator of the particular software program provides information about this normal range of operations, in the same way that a manufacturer may provide operating parameters for a physical device.

Based on the information about the specific program that is involved in the write operation, a component 509 decides whether the write operation may proceed. If the decision is to not allow the write operation, then the request is rejected. If the decision is to allow the write operation based on properties of the specific program, then the request is forwarded to a write controller 510 which then writes the application-specific configuration or session data into the memory area 205.

Figure 6:
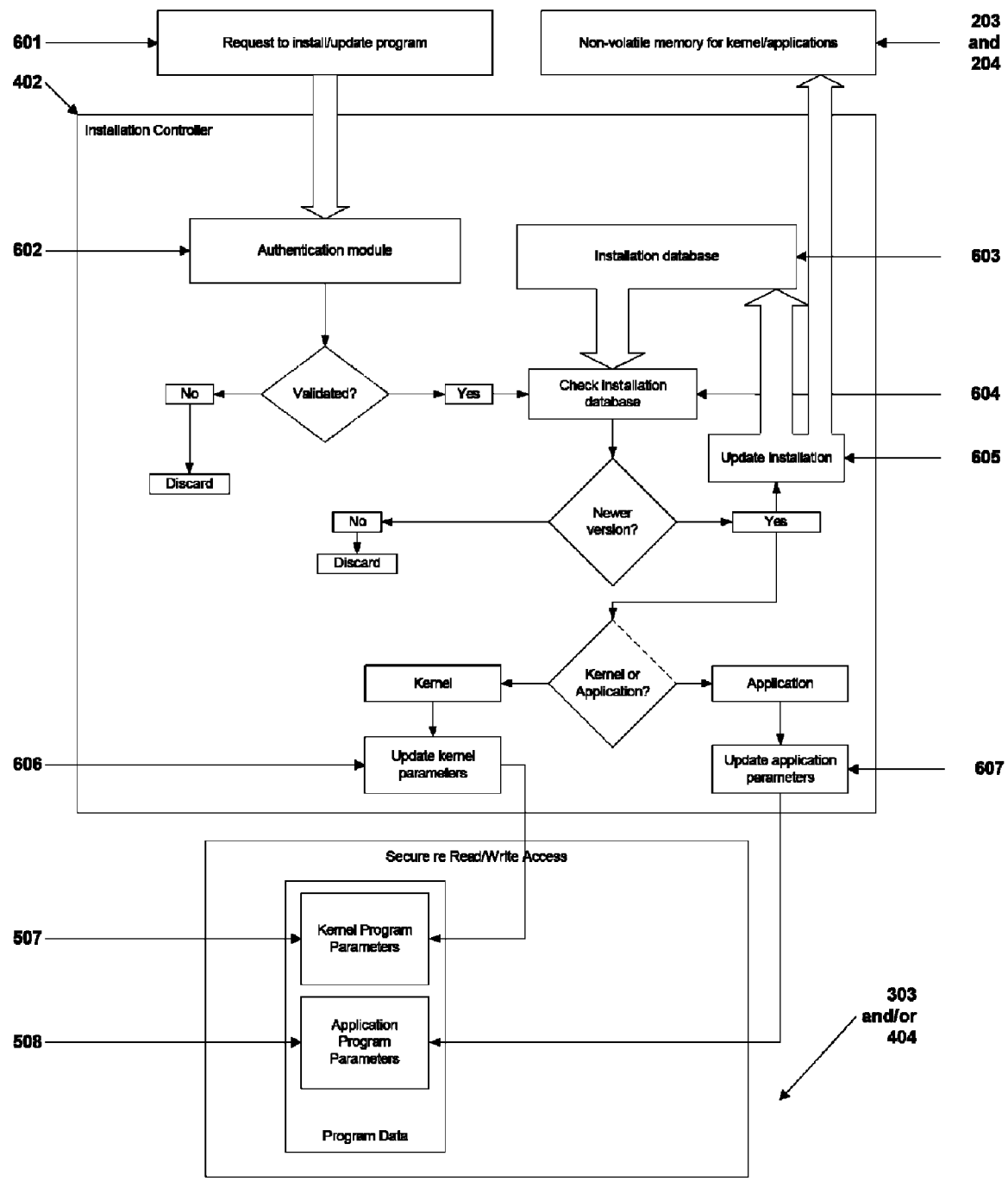
FIG. 6 illustrates the installation controller through which software can be installed or updated on the computer system.

FIG. 6 illustrates the installation controller 402. Installations are done through an authentication system that is not modifiable without replacing the controller hardware. The installation procedure may be done in different ways, such as at the time of building the computer system (factory installation), through installation of hardware without opening the computer case (hardware installation), or through software update with appropriately secure authentication support.

The authentication system in FIG. 6 may use a cryptographic protocol, such as public-key or private-key cryptosystems. A program can be validated by verifying that the creator of the program is indeed who they claim to be, through a key-based certification authority. This authentication is typically used for software programs that are downloaded through a verification process to check for authenticated signature. In the present invention, such an authentication process is part of the hardware that prevents modifications of the programs by viruses and other malicious software. Software components used for authentication can themselves be susceptible to attacks that alter their behavior. In the present invention, a non-modifiable hardware component is used to perform the authentication.

In FIG. 6, a request 601 to install or update software through the installation controller 402 enters a non-modifiable hardware authentication module 602. This module validates the request using one of several commonly used authentication methods to verify the identity of the creator of the program. If the program is not thus authenticated it is considered to be invalid and it is discarded without modifying the non-volatile memory. Once validated, the program has to be checked against an installation database 603 stored in non-volatile memory within the installation controller. A module 604 checks this database to see whether the program to be installed or updated is indeed a new version. Other checks may be done, for example to see whether this program is compatible with other installed programs. If the program is indeed to be installed on the basis of the checking in module 604, then three actions take place. First, the program's code is changed in either the kernel or application area of the non-volatile memory 203 or 204. Second, the installation database 603 is updated through an updating module 605. Third, the program parameters within areas 507 or 508 in the secure read/write access module (303 and/or 404) are updated with information about this installed program. If the program is a kernel program, information is updated through module 606, if it is an application program the parameters are updated through module 607.

The non-volatile memory can be flash, MRAM, SONOS, MONOS, FeRAM, or other types of memory technologies.

One of the problems of flash memory is limited amount of writes (say 10,000 or 100,000 times). Hence it is important to protect the main application and/or OS areas with write protection. Large parts of the application code, which do not require modification, are stored in write protected regions of the non-volatile memory. This will also result in improved security since these regions cannot be corrupted by viruses or malicious or inadvertent actions. Changeable data is stored in non-volatile or volatile RAM.

One implementation possibility is to physically organize the application and/or operating system in a flash memory device with write protection. The flash will be part of the main memory. Updating an application can be the process of buying a new nonvolatile memory module or flash memory and plugging it in, eliminating the painful process of installation.

Figure 7:
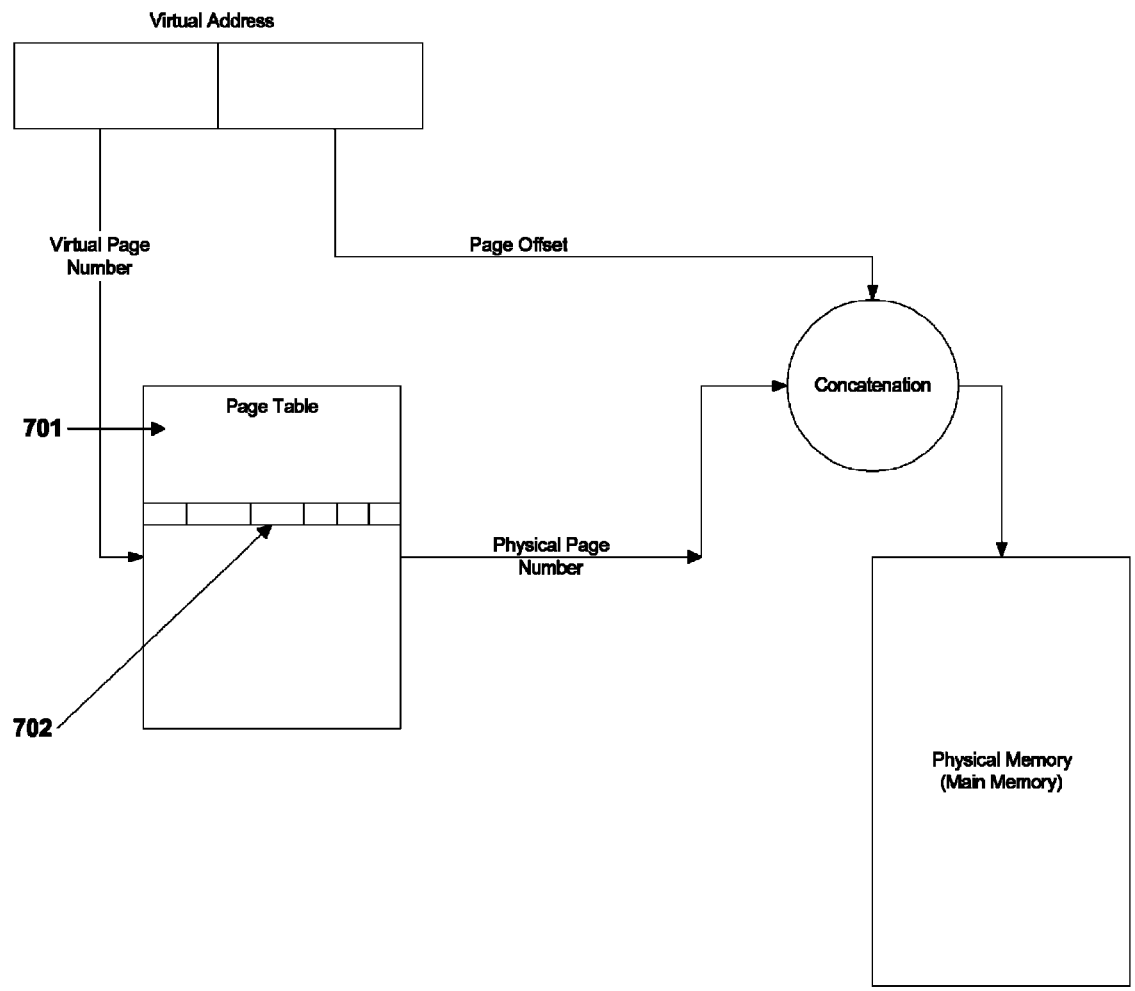
FIG. 7 illustrates translation of virtual addresses to physical addresses using a page table.
Figure 8:
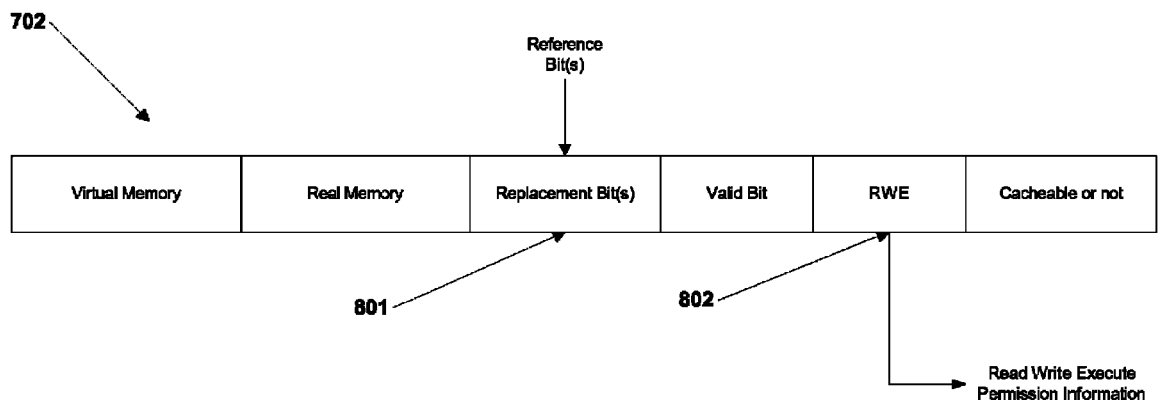
FIG. 8 illustrates a typical page table entry

In order to implement the proposed method in a computer with virtual memory, one needs to pin down the applications code and/or operating system to a region of the main memory and effectively bypassing the virtual memory mechanism. By pinning down the application code and/or the operating system, we simply mean that the relevant software is enabled to stay permanently in the non-volatile region of the main memory. Virtual memory systems are typically paged and pages are replaced when new pages cannot find space. The region of the main memory where OS is residing should not allow any replacements. One can accomplish the pinning down in a variety of ways. It can be accomplished by hardware or software or a combination of the two. In virtual memory systems, the page table contains the information to translate virtual addresses to real addresses. FIG. 7 illustrates the overview of the translation. The page table 701 contains entries 702 to map the virtual address to physical address. There are several entries 702 to correspond to the various pages in the virtual memory. There are many implementations for page tables such as hashed page tables and multi-level page tables. FIG. 8 shows a typical page table entry in detail. In some implementations, the full virtual address may not be stored in the page table. FIG. 8 shows that in addition to the translation information, the page table also contains information to help with replacements, caching, and read/write/execute (RWE) permissions. A mechanism to achieve pin down consists of initializing/hard-coding the Reference bit(s) and/or replacement information bit(s) 801 with values to indicate inhibiting of replacements, the valid bit to indicate presence in the real memory at power up itself and also values in RWE bits to implement write protection. For instance, in an example implementation, if 3 bits are used for RWE permissions 802, R can be set to 1 indicating read permissions, W can be set to 0 indicate no write permissions, and E can be set to 1 indicating execute permissions. Other implementations using only 2 bits with some encoding is also possible. The pinning down can be achieved in hardware ways by hardcoding the values into the storage that holds the page table information. It may also be achieved by making BIOS or an initialization software write it quickly at boot time. It can also be accomplished by a combination of hardware and software techniques. When an operating system or an application is updated if it is going to span more pages than the previous version, it will be necessary to modify the page table entries correspondingly.

Another additional mechanism to speedup the boot with pinning-down will be to initialize/hard-code TLB (Translation Lookaside Buffer) entries with relevant page table entries. The TLB operates as a cache for the page table and TLB misses can be avoided for the applications and/or the operating system to reduce the latency to boot. The TLB entries can be hardcoded to indicate presence of the relevant page table entries in TLB. Initializing the page table and TLB entries can be done by a BIOS-like software.

There is an approach used to provide instant-on capabilities, such as splashtop and a similar Dell Lattitude-On [12]. These approaches do not involve the methods of this invention, but instead provide just a few often-used applications in a simplified operating system that exists on the computer and may be activated instead of complete applications. By contrast the invention described here pertains to quick or instant activation of the computer's applications and/or main operating system. The operating system referred to in this invention is a full-blown operating system like Microsoft Windows or Linux. The applications referred to in this invention are programs like Microsoft Word, Excel, etc.

Although the invention is described with specific details, it is intended to cover alternatives, modifications and equivalents, as can be reasonably included within the spirit and scope of the invention as defined by the appended claims. It is noted that the headings are used only for organizational purposes and not meant to limit the scope of the descriptions or claims.

What is claimed is:

1. A computer system with a secure instantly-available application comprising:

a processor coupled to a virtual memory system with a write-protection mechanism;

wherein the virtual memory system comprises a physical memory region and a virtual memory region, wherein the physical memory region has a non-volatile main memory with write-protected region, wherein the write-protected mechanism prevents additional writes to the write-protected region after initial manufacture and/or installation, an user application code is stored into the write-protected region of the non-volatile main memory region before power-up by an user, wherein the user applications code in the write-protected non-volatile main memory region is write- protected by hard-coding at least one of plurality of bits in a page-table mapping entries;

wherein a mapping entry is selected from a group of reference bits, replacement information bits, and read-write-execute (RWE) bits, wherein the read-write-execute bits indicate a permissions to read, write and execute the user application code in a selected page; and an application configuration and a session data for each of the user application code in non-volatile write protected main memory, and a secure read-write access to the write protected region, the configuration data specifies selected options that control the execution of each of the user application code and the session data specifies information about previous completed or suspended executions of each of the user application code;

wherein the secure read-write access to the write protected region selectively permits the processor to write to the write-protected non-volatile main memory region which contains the application configuration and the session data;

wherein the user application code is made secure by preventing writes to the non-volatile write protected region in which the user application code is residing;

a malicious code cannot be transferred to the non-volatile write protected main memory region which contains the user application code by the write-protection mechanism and the user application code is directly executed from the non-volatile write-protected region;

wherein the user application code is not transferred from a disk to the non-volatile main memory region at power-up thereby resulting in an instantly-available application.

2. The computer system as in claim 1 wherein the application code in the write-protected non-volatile main memory region is write-protected by a combination of hardware, and software
wherein the hardware includes a system bus interface; and
wherein the software includes a memory access controller
wherein the memory access controller ((that)) permits only read access ((only)) to the ((user)) application code from the system bus interface.

3. The computer system as in claim 1 wherein the write-protected region containing the application code is comprised of flash memory.

4. The computer system as in claim 1 wherein the main memory region further comprises a read-write-memory region
wherein the read-write memory region ((that)) may be changed during the user operation of the computer system.

5. The computer system as in claim 1 further comprising application configuration/session data stored in the write-protected region of the non-volatile main memory and
wherein part of the configuration information is stored in the write-protected region of the non-volatile main memory region and
wherein another part of the configuration/session information is stored in the read-write region of the non-volatile main memory.

6. The computer system as in claim 1 with a method and apparatus for factory installation of an application
wherein the non-volatile write-protected region of the main memory is modified.

7. The computer system as in claim 1 with a method to securely modify the write-protected region of non-volatile main memory
wherein the method utilizes a public-key cryptosystem to securely modify the write-protected region of main memory.

8. The computer system as in claim 1 further comprising a non-volatile memory controller wherein the memory controller permits access to the contents of the non-volatile write-protected region of the main memory as in a normal disk drive.

9. The computer system as in claim 1 where the computer is an embedded computer.

10. A method to create secure, instantly available applications in a computer system, the method comprising of:
using a processor coupled to a virtual memory system wherein the virtual memory system comprises a physical memory region and a virtual memory region;
creating the physical main memory using a non-volatile memory;
creating a write-protected region in the non-volatile main memory region wherein a write-protection mechanism is used to prevent additional writes to the write-protected region after initial manufacture and/or installation;
storing an application code into the write-protected region in the non-volatile main memory at initial manufacture and/or installation;
wherein the application code in the non-volatile memory region further comprises an application configuration and a session data for each of the application code, and a secure read-write access to the write protected region, the configuration data specifies selected options that control the execution of the application code and the session data specifies information about previous completed or suspended executions of the user application code;
wherein the secure read-write access to the write protected region selectively permits the processor to write to the write-protected non-volatile main memory region which contains the application configuration and the session data;
wherein the write-protection mechanism further comprises creating hard-coded page table entries, wherein the page table entries specify locations of the application code pages in the (non-volatile) write-protected regions of the non-volatile main memory;
creating appropriate page table entries to indicate that the non-volatile main memory storing the application code is read-only, where no writes can be performed to (this region) the non-volatile main memory after initial manufacture and/or installation;
preventing transfer of a malicious code to the non-volatile main memory containing the application code thereby making the application secure and executing the application code directly from a write-protected region of the non-volatile main memory;
wherein the application code is not transferred from a disk to the non-volatile main memory at power-up, thereby resulting in an instantly available application.

11. The method as in claim 10 further comprising initializing TLB entries with values to indicate presence of applications code in the write-protected region of the non-volatile main memory.

12. The method as in claim 10, where the method is implemented using hardware by hard coding TLB entries to indicate the presence of the applications code in the write-protected region of the non-volatile main memory region.

13. The method as in claim 10, where the method is implemented in software by writing the TLB entries from a BIOS to indicate the location of the applications code in the write-protected region of the non-volatile main memory.

14. The method as in claim 10, where the method is implemented using a combination of hardware comprising at least a system bus interface, and software comprising a memory access controller that permits only read access to the applications code from the system bus interface.

* * * * *